(12) United States Patent
Broyles (10) Patent No.: US 9,007,953 B1
(45) Date of Patent: Apr. 14, 2015

(54) ESTIMATING AVERAGE USER THROUGHPUT IN A WIRELESS NETWORK

(71) Applicant: Sprint Communications Company L.P., Overland Park, KS (US)

(72) Inventor: Daniel Stewart Broyles, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 201 days.

(21) Appl. No.: 13/729,215

(22) Filed: Dec. 28, 2012

(51) Int. Cl.
*H04L 12/26* (2006.01)
*H04W 16/08* (2009.01)

(52) U.S. Cl.
CPC ............. *H04L 43/062* (2013.01); *H04W 16/08* (2013.01)

(58) Field of Classification Search
CPC .................................................. H04W 72/082
USPC ......................................................... 370/352
See application file for complete search history.

(56) References Cited

U.S. PATENT DOCUMENTS

| | | | |
|---|---|---|---|
| 2009/0003236 A1* | 1/2009 | Aoyama et al. | 370/253 |
| 2010/0177692 A1* | 7/2010 | Gil | 370/328 |
| 2013/0163446 A1* | 6/2013 | Kruger et al. | 370/252 |

OTHER PUBLICATIONS

M. Andrews, L. Qian, A. Stolyar "Optimal Utility Based Multi-User Throughput Allocation subject to Throughput Constraints" (2005) IEEE.
T. Bonald, J. Virtamo "A Recursive Formula for Multirate Systems with Elastic Traffic" (2005) IEEE.
D. Moskaluk "MeshAP Capacity Planning" (Jan. 4, 2004) Moskaluk Inc.

* cited by examiner

*Primary Examiner* — Dang Ton
*Assistant Examiner* — Mewale Ambaye (57) ABSTRACT

A method, system, and medium are provided for estimating user throughput as a function of network load. The function that governs a relationship between user throughput and network load is derived after simulating network traffic during busy hours on a wireless network. The simulated traffic is shaped to be similar to packet traffic received on the network. In turn, the simulated traffic is assigned to one or more carriers that are configured to resemble the network carriers. Upon processing the simulated traffic, user throughput is calculated and a function is derived from the network load during the busy hour and the calculated user throughput. The derived function is employed to predict the load at which user throughput falls below acceptable levels.

20 Claims, 7 Drawing Sheets

ESTIMATING AVERAGE USER THROUGHPUT IN A WIRELESS NETWORK

SUMMARY

A high-level overview of various embodiments of the invention is provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter. In brief and at a high level, this disclosure describes, among other things, ways to plan for changes in a network configuration based on a relationship between an estimated user throughput and network load.

The wireless network, in some embodiments, includes cell sectors that are maintained by a network provider. The traffic generator is configured to simulate traffic received in the wireless network. Each cell sector may be modeled based on the simulated traffic. The simulated traffic is configured at the traffic generator to vary based on media type associated with packet traffic that traverses the wireless network. In turn, the traffic generator assigns the simulated traffic to carriers that are configured to resemble carriers available in a cell sector. In turn, the average user throughput is calculated based on how quickly the carriers process the simulated traffic. In some embodiments, a function is derived from the size of the simulated traffic processed by the carriers and the average user throughput. A network planner may use the derived function to plan for network upgrades and to maintain an agreed upon user throughput.

In other embodiments, traffic is generated by a computing system. The traffic simulates various media types that traverse sectors of a network. The computing system also configures carriers to resemble carriers or channels available in a sector of the network. In turn, the generated traffic is assigned by the computer system to the carriers. The computer system then generates sessions, assigns them to the carriers, and calculates a current load of the generated traffic for each session of the plurality of carriers. An effective data rate for the carriers is determined by the computer system based on spectral efficiencies for the carriers. The computer system reduces the current load by the effective data rate during each session until the current load reaches zero. An end time for each session is recorded by the computer based on when the current load goes to zero. User throughput is estimated by the computer system, in certain embodiments, based on the time required to process each session's simulated traffic.

BRIEF DESCRIPTION OF THE SEVERAL VIEWS OF THE DRAWINGS

Illustrative embodiments of the invention are described in detail below with reference to the attached drawing figures, and wherein:

FIG. 5A illustrates a linear relationship gleaned from some simulated traffic, in accordance with embodiments of the invention;

FIG. 5B illustrates a non-linear relationship gleaned from some simulated traffic, in accordance with embodiments of the invention.

DETAILED DESCRIPTION

The subject matter of the patent is described with specificity herein to meet statutory requirements. However, the description itself is not intended to define the invention, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Embodiments of the invention are directed to estimating user throughput. A computer system is configured to simulate network traffic for a wireless network or wired network. The network traffic is managed by the computer system to estimate the average user throughput in the network during the busy hour. A network planner may observe a change in the average user throughput as the traffic peaks in the network sector.

In other embodiments, the network planner may use the computer system to simulate traffic for new products or services. In turn, the computer system may provide a new estimate for average user throughput. These estimates illustrate the affect a new product or service may have on network capacity and average user throughput.

Average user throughput may be used to simplify network planning. Instead of using total traffic to determine cell or network exhaust limits, which are hard exhaust points, e.g., either the total tonnage is above the exhaust point or it isn't. The average user throughput allows network planners the ability to specify variable levels of performance in the sector or wireless network.

Accordingly, embodiments of this invention provide a means to automatically identify a function that relates user throughput and network load. This function is identified by simulating the traffic produced from applications employed by users of the wireless network. In addition to the traffic, a computer system also simulates the carriers available in the wireless network. The identified function may encapsulate a relationship between user throughput and network load.

In certain embodiments, the average user throughput is estimated in part based on spectral efficiency across the entire sector. The spectral efficiency is configured such that it simulates the various wireless network conditions experienced in each sector. For instance, a carrier having a five MHZ channel may be assigned a spectral efficiency of 1.6 bps/Hz. Accordingly, the effective bandwidth for the carrier may be eight Mbps (5 MHz*1.6 bps/Hz). The computer system may use the effective bandwidths for each carrier when measuring user throughput. Thus, effective bandwidths for the carriers may be based on spectral efficiencies for the carriers and the number of simultaneous sessions on each carrier.

Throughout this patent several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the embodiments of the invention. The following is a list of these acronyms:

BTS Base Transceiver Station
CDMA Code Division Multiple Access
CD-ROM Compact Disc, Read Only Memory
CDMA Code Division Multiple Access
DVD Digital Versatile Disc
EVDO Evolution Data Optimized
EEPROM Electrically Erasable Programmable Memory
GPRS General Packet Radio Service
GPS Global Positioning System
GSM Global System for Mobile communications (Groupe Special Mobile)
IP Internet Protocol
IPv4 Internet Protocol Version Four
IPv6 Internet Protocol Version Six
LED Light Emitting Diode
LTE Long Term Evolution
NFC Near-Field-Communication
PTT Push-To-Talk
RAM Random Access Memory
ROM Read Only Memory
RNC Radio Network Controller
SMS Short Message Service
TDMA Time Division Multiple Access
UMTS Universal Mobile Telecommunications System
USB Universal Serial Bus
Wi-Fi Wireless Fidelity
WiMAX Worldwide Interoperability for Microwave Access Embodiments of the invention can take the form of a method, server, network device, system, or computer-readable media embodied with a specific set of computer-executable instructions. Computer-readable media include both volatile and nonvolatile media, removable and nonremovable media, and contemplate media readable by a database, a switch, and various other network and computing devices. Computer-readable media include communication media and computer storage media implemented in any method or technology that stores information. Examples of stored information include computer-useable instructions, data structures, program components, and other data representations. Examples of computer-readable media include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. The computer-readable media can store data momentarily, temporarily, or permanently.

In one embodiment, the network server is configured with several input and output components. The network server may include applications for simulating traffic on different networks. The applications may include video applications, voice applications, SMS applications etc. The network server generates the traffic and assigns the simulated traffic to simulated carriers of the network. The network server may estimate throughput of a user based on the carrier's processing of the simulated traffic for the user.

Figure 1:
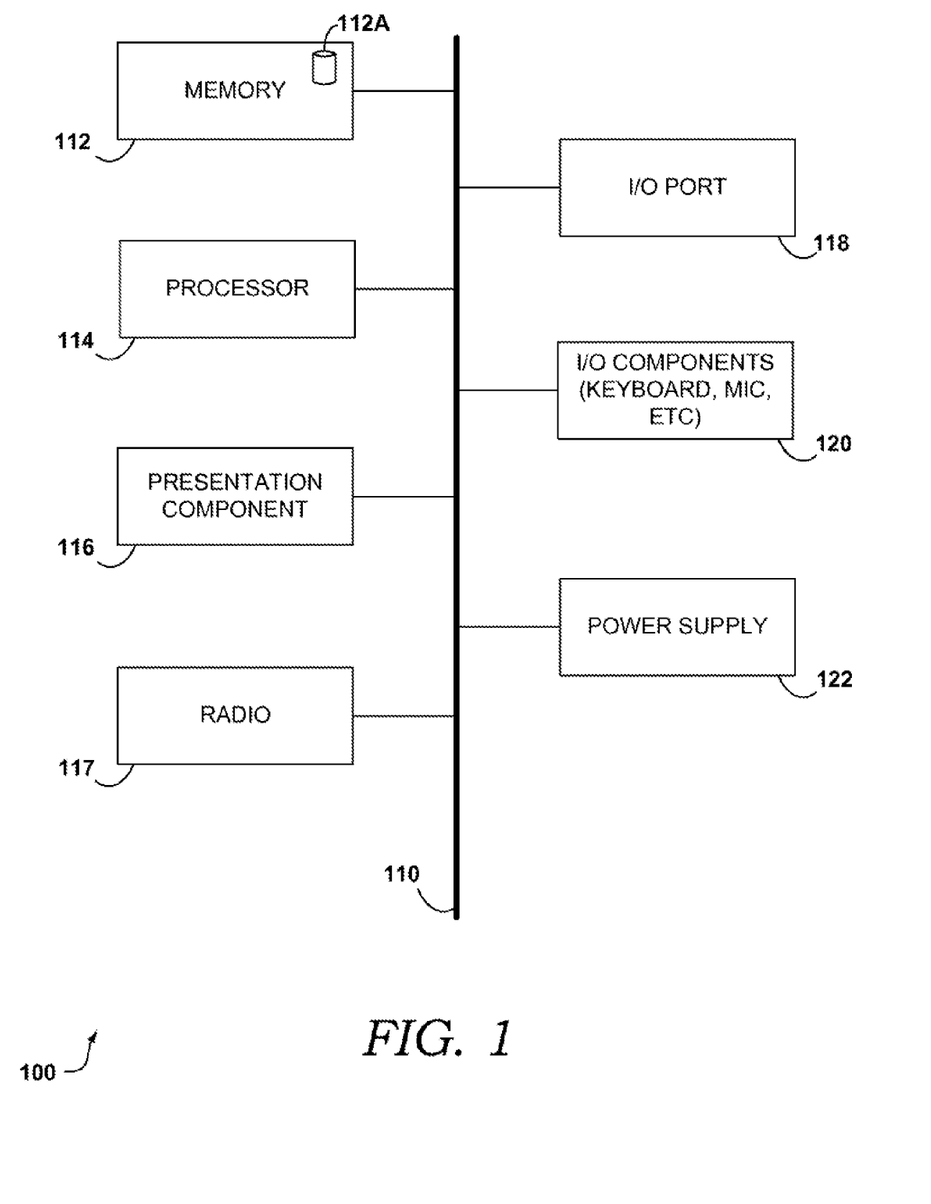
FIG. 1 depicts a block diagram of an exemplary computer system in accordance with embodiments of the invention.

FIG. 1 depicts a block diagram of an exemplary network server in accordance with embodiments of the invention. Turning now to FIG. 1, a block diagram of an illustrative network server is provided and referenced generally by numeral 100. Although some components are shown in the singular, they may be plural. For example, network server 100 might include multiple processors or multiple radios, etc. A network server 100 may be one of many devices, including, but not limited to, a switch, a router, a mobility agent, or a bridge. As illustratively shown, network server 100 includes a bus 110 that directly or indirectly couples various components including memory 112, a processor 114, a presentation component 116, a radio 117, input/output ports 118, input/output components 120, and a power supply 122.

We have previously described various memory components that memory 112 might take the form of. Memory component 112 can include any type of medium that is capable of storing information (e.g., a database 112A). The database 112A may be configured to store network access credentials, including a network identifier, password, or key associated with the network server 100; location information based on GPS; and any information that the network server 100 transmits to the wireless network. The database 112A may also store applications like traffic generator applications that simulate network traffic. In some embodiments, the simulated traffic may also be stored in the database 112A. If needed, the traffic may also be stored remotely when the memory component 112 is of limited capacity.

Processor 114 might actually be multiple processors that receive instructions associated with the applications and process the instructions accordingly. Presentation component 116 includes the likes of a display and a speaker, as well as other components that can present information (such as a lamp (LED), or even lighted keyboards) associated with the outputs of applications or other components of the network server 100.

The network server 100 may store cell sector information and carrier information generated by the traffic generator applications. The carrier information may include carrier profiles that simulate carriers of the wireless network. The carrier information may include, among other things, session assignment, packets processed by the carrier, start times for sessions, and end times for sessions.

The communication interface of the network server 100 may be a radio 117 that facilitates communication with a wireless telecommunications network. Illustrative wireless telecommunications technologies include CDMA, GPRS, TDMA, GSM, WiMAX, LTE, UMTS, and the like. In some embodiments, radio 117 might also facilitate other types of wireless communications including Wi-Fi communications, Bluetooth™, Zigbee, or other near-field communication. In other embodiments, the communication interface of the network server 100 may be a wired line like Ethernet.

Input/output port 118 of network server 100 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into network server 100. Power supply 122 includes items such as batteries, fuel cells, or any other component that can act as a power source to power network device 100.

Accordingly, a network server 100 simulates network traffic for one or more sectors of a wireless network. The network server may execute a traffic generator that formats the traffic generated based on applications run by users of the wireless network. The traffic generator may also simulate the carriers and channels available for processing the simulated traffic. It will be understood and appreciated by those of ordinary skill in the art that the network server 100 shown in FIG. 1 is merely an example of one suitable network server 100 and is not intended to suggest any limitation as to the scope of use or functionality of the embodiments of the invention. Neither should the network server 100 be interpreted as having any dependency or requirement related to any single component or combination of components illustrated therein. The single unit depictions are meant for clarity, not to limit the scope of embodiments in any form.

In some embodiments, a network server on the network generates a graphical user interface for configuring simulated network traffic and simulated network carriers. The user interface may specify media types for user applications. Additionally, the user interface allows the user to simulate the carriers available in the wireless network. Based on the simulations, the network server may estimate the average user throughput.

Figure 2:
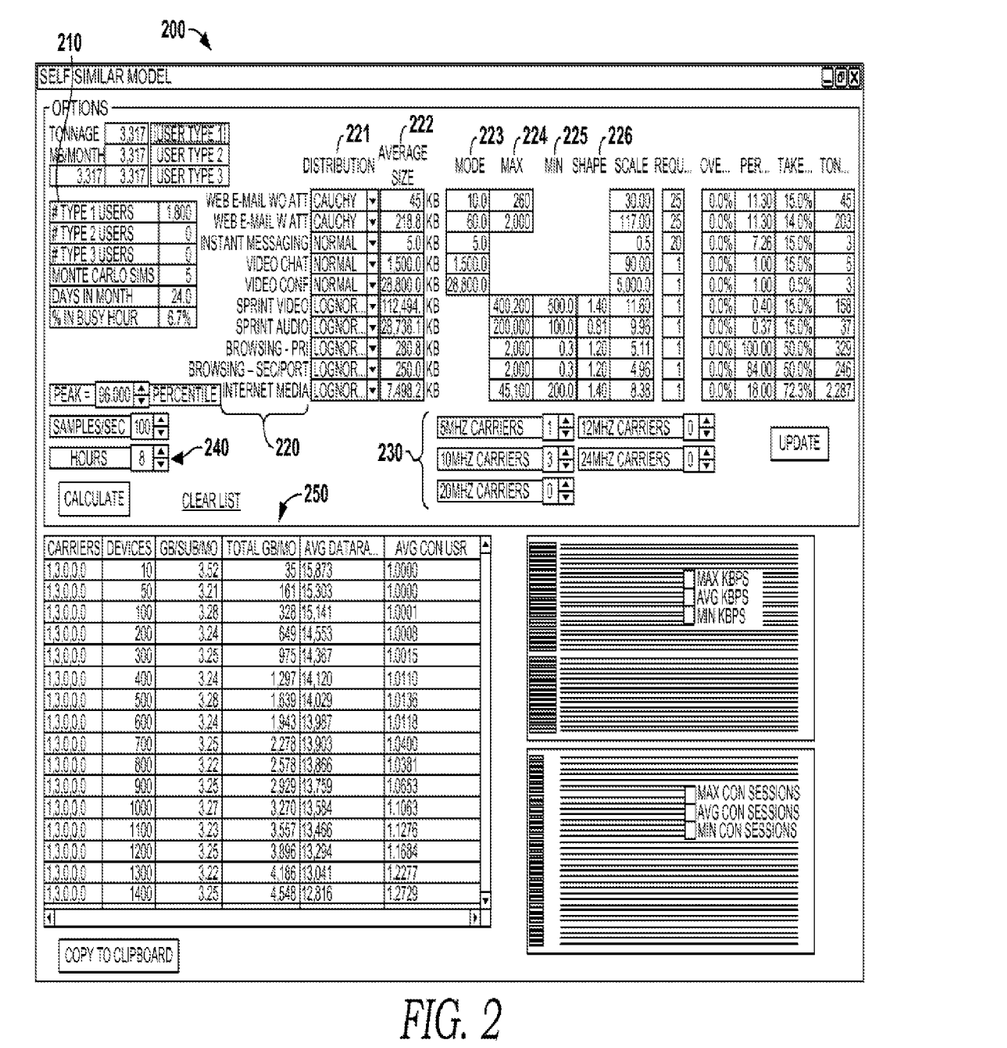
FIG. 2 depicts a graphical user interface of an exemplary traffic generator in accordance with embodiments of the invention.

FIG. 2 depicts a graphical user interface of an exemplary traffic generator in accordance with embodiments of the invention. Turning now to FIG. 2, an illustrative graphical user interface 200 is provided and referenced generally by the numeral 200, which depicts a number of fields that are used to configure the simulated traffic. The graphical user interface 200 may include a simulated number of users 210, simulated applications 220, simulated carriers 230, and simulated busy hours 240. After receiving the appropriate configuration selection and commands, the traffic generator may produce simulated traffic 250.

The simulated number of users 210 may include a number of users connected to the wireless network or users per sector of the wireless network. The users may be categorized as voice-only users, voice and data users, or data-only users. The simulated number of users may include users of one of the categories. In other words, the simulated users may be homogenous. In other embodiments, the simulated users may include users from any of the categories, e.g., heterogeneous users.

The simulated applications 220 may specify a mix of packet types that are being simulated on the wireless network. In some embodiments, the traffic generator may include applications that have not been released to users of the wireless network. The simulated applications may also include features or codecs not yet available to users in the real network. The traffic generator may configure the network traffic to test the features, codecs, or applications not yet available to the users in the real network. Accordingly, network planners may be able to predict how new releases will impact network performance and average user throughput.

The simulated applications 220 comprise email with attachments, email without attachments, instant messaging, video chat, video conference, audio only calls, audio only conferences, web browsing, secure web browsing, and internet media. The traffic generator may simulate a mix of user applications (email, web browsing, video, etc). In turn, the traffic generator simulates data traffic sessions based upon the mix of applications.

In some embodiments, the traffic generator may receive configurations that vary the size of the simulated packet traffic. The configurations may include, among other things, distribution 221, average size 222, mode 223, max 224, min 225, and shape 226. A network planner may provide the various configurations to the traffic generator.

The distribution 221 simulates a size variance for the packet traffic. The distributions may simulate traffic that is self-similar, which is a characteristic of actual data traffic. The distribution of the sizes may be modeled from statistical distributions, like normal, lognormal, Cauchy, Poisson, etc. The traffic generator may select the appropriate distribution based on the media applications that are being simulated for the wireless network. The average size of the packets for each media type is specified to allow the traffic generator to produce a proper variance in size. Based on the statistical distribution selected, the traffic generator may also require, among other things, a mode 223, a maximum size 224, a minimum size 225, or a shape 226 to produce and simulate traffic with the appropriate size. These distributions may simulate the sessions and corresponding packet sizes for each of the media types.

The start time of each session may be randomly distributed through the specified busy hours. The size of each packet within a session or the size of each session may be determined from a random generator using the specified distribution for the media formats. In turn, the traffic generator may store a session identifier, a size for each packet within a session, the size for each session, and the start time for the session.

The simulated carriers 230 process the simulated traffic. As explained above, the simulated traffic sessions include a start time and a size of the session. However, the finish time or duration of the session is not known immediately. The duration will depend on which carrier is assigned the session and the number of other sessions that are being served by that carrier at the same time. The traffic generator obtains the duration from the simulated carriers 230. In turn, the duration is stored by the traffic generator. The session duration may be used to calculate the average data rate for each user session. In turn, the traffic generator derives the average user throughput from the average data rate for each session by aggregating the average data rate for each session. For instance, the aggregated average data rate for all users and all session is calculated. In turn, the aggregated average data rate for all users and all sessions is calculated, and may be divided by the number of users to arrive at the average user throughput. In one embodiment, a weighted average user data rate may be calculated for all user sessions where the weight may be based on the session sizes.

The simulated busy hour 240 is the period for which the traffic is simulated by the traffic generator. The simulated busy hour may range from one to ten hours. In turn, the simulated traffic 250 for the period may be made available by the traffic generator. In some embodiments, the graphical user interface 200 may present the simulated traffic for review.

The traffic generator may simulate packets for several busy hours. The average data rate may be calculated by the traffic generator for each session. In turn, the average data rate may be aggregated to obtain the average user throughput over the number of sessions in the busy hours. The graphical user interface 200 is part of a traffic generator that configures the traffic that simulates what would happen in a live wireless network. Accordingly, the simulated traffic is processed by a set of simulated carriers. Based on the processing speed of these simulated carriers, the traffic generator may determine the relationship between average user throughput and network load.

The illustrated elements of graphical user interface 200 are meant to be exemplary in nature, and the various lower-level details of the elements are not elaborated on so as to not obscure the embodiments of the invention. Clearly, some of the elements may be absent in some embodiments of the invention, and additional elements not shown may also be part of graphical user interface 200. Attempting to show all of the various elements of graphical user interface 200 would obscure certain novel aspects, and we will refrain from such elaboration at least for the sake of brevity.

A network server, in one embodiment, is configured to simulate traffic in a wireless network. The network server may also simulate users and carriers of the wireless network. The simulated traffic is processed by the carriers to obtain data that is utilized to calculate average user throughput.

Figure 3:
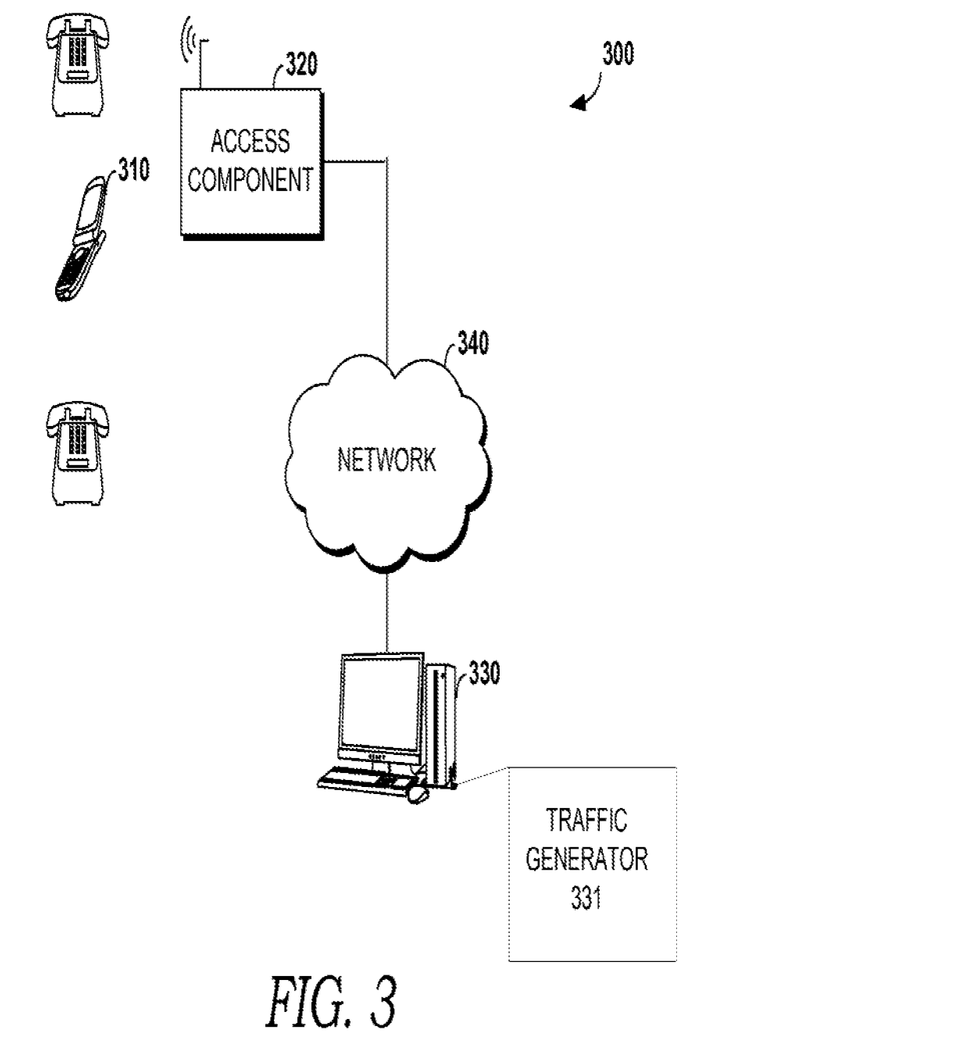
FIG. 3 depicts a network diagram of an exemplary simulated wireless network in accordance with embodiments of the invention.

FIG. 3 depicts a network diagram of an exemplary simulated wireless network in accordance with embodiments of the invention. Turning now to FIG. 3, the simulated wireless network 300 includes simulated client devices 310, simulated carriers 320, network server 330, and a simulated communication network 340.

The simulated client devices 310 may include devices that are configured to execute various media applications. The media applications may include voice, video, web browsing, etc. The simulated client devices 310 are configured to generate traffic based on the media applications executed by users. In one embodiment, the traffic is randomly generated.

The simulated carriers 320 receive the traffic from the simulated clients 310. The simulated carriers 320 may have multiple channels that are used to process the traffic. The simulated carriers 320 may provide a session duration measurement that is used to determine the average data rate.

The simulated communication network 340 is produced by the network server 330 to manage the traffic in the simulated environment. The network server 330 includes a traffic generator 331 that configures the simulated client devices 310, the simulated carriers 320, and the simulated traffic. This environment is utilized for network planning purposes. The simulated traffic may be measured by the network server 330 to derive a function that encapsulates a relationship between the network load and average user throughput.

Accordingly, the simulated environment is configured by the traffic generator. The simulated traffic is processed by the various elements of the simulated environment. The traffic generator utilizes a speed at which the traffic is processed to estimate user throughput from which a function identifying a relationship between user throughput and network load is derived.

In yet another embodiment, the traffic generator is configured to execute a method for assigning simulated traffic to each of the simulated carriers. The traffic generator may be configured to simulate a scheduler that assigns packets to the best available carrier on a wireless network. The traffic generator assigns all the simulated traffic to the carriers in an iterative manner.

Figure 4:
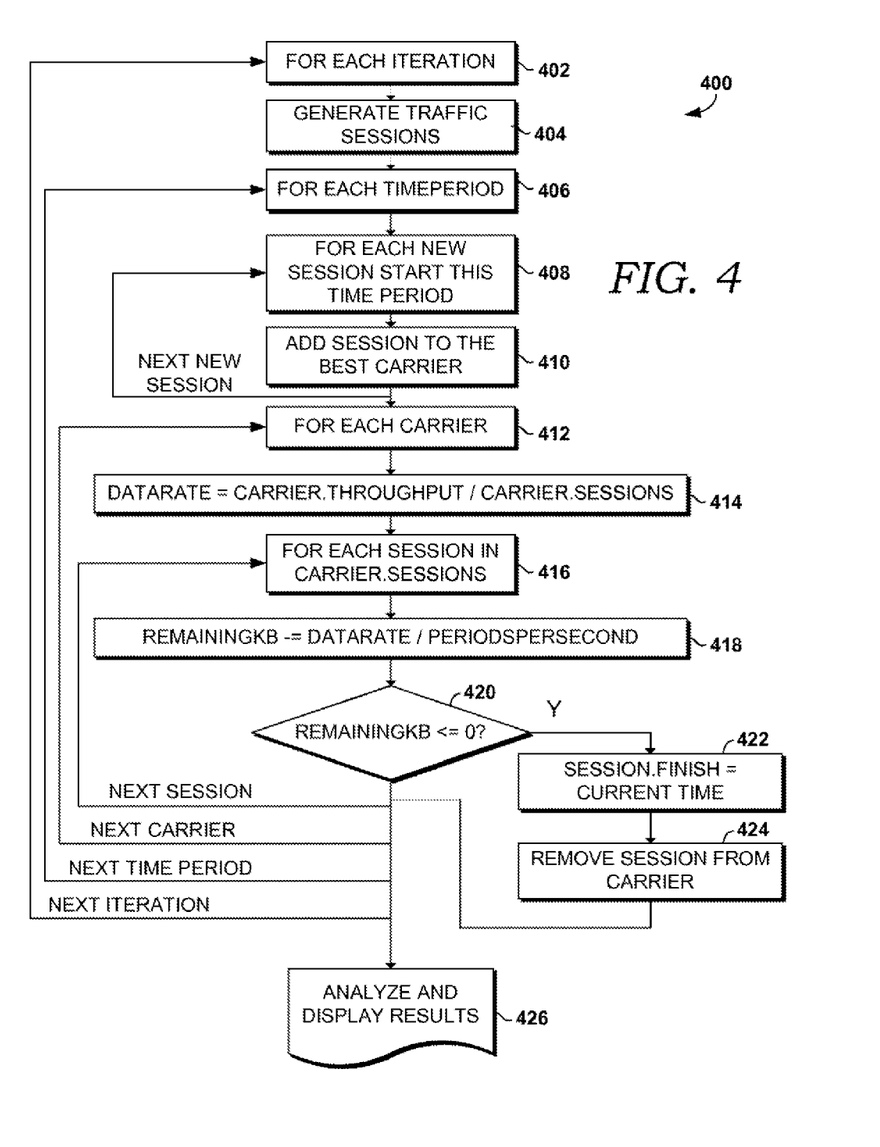
FIG. 4 depicts an exemplary logic diagram for assigning simulated traffic in the wireless network in accordance with embodiments of the invention.

FIG. 4 depicts an exemplary logic diagram for assigning and processing simulated traffic in the wireless network in accordance with embodiments of the invention. Turning now to FIG. 4, in step 402, the traffic generator may determine the number of iterations needed to simulate traffic in the busy hour. For instance, the number of iterations may be 24, where the iterations may be used by the traffic generator to improve the statistical relevance of the resulting data. The traffic generator selects a first iteration, at step 402, and recursively performs the method until the last iteration. In turn, the number of time periods is calculated by the traffic generator. For instance, when the busy hour is 10 hours per day and a communication time slot of 10 ms is available for each carrier, the traffic generator may evaluate the following: busy_hour*3600*00 Time_periods to arrive at the number of time slots (3.6 M time slots) during the busy hour.

At step 404, new traffic sessions are generated for the busy hour. The traffic sessions identify application types, session sizes, and start times relative to the busy hour. At step 406, a current time period in the busy hour time sequence is selected by the traffic generator. In step 408, sessions with a start time in the current time period are identified. The identified sessions are iteratively assigned to the best available carrier, in step 410.

The traffic generator simulates processing of the sessions assigned to the carriers, in step 412. The data rate for each carrier is determined by dividing the bandwidth, represented as "carrier.throughput" by the number of sessions assigned to the carrier, at step 414. The data rate is used to simulate processing for each session by the traffic generator. For each session assigned to the carrier (carrier.sessions), the size of all the packets in the current session is represented as remainingKB. The packets may be processed according to available carrier data rate in step 416.

For each time slot (10 ms), the data rate per slot is determined by dividing the current data rate by the number of time slots (100) in a second. Thus, during the current time slot, the size of the session is reduced by the current data rate divided by 100, in step 418. This simulates processing of some of the packets in the current session. At step 420, the traffic generator determines whether the session has been processed completely. If the remaining session size is zero, the session is finished, and the end time for the session is stored in session.finish as the current time slot, at step 422. In turn, the session is removed from the list of sessions assigned to the carrier by the traffic generator at step 424. The next carrier is obtained and the process returns to step 412.

If the session size is not zero, the session requires further processing in the carrier simulated by the traffic generator. The carrier retains the session for continued processing. In some embodiments, continued processing of retained sessions may occur in the next time period. The next session is obtained and the process returns to step 416. The process repeats until each session is completely processed by the simulated carrier. In turn, each available carrier is processed in a similar manner for each of 3.6 million timeslots. In some embodiments, the simulated carriers may process the assigned sessions in parallel during the available time periods. For the iterations, the traffic generator calculates the average user throughput. This information may be used to determine a function that relates the average user throughput to the network load. The traffic generator, in step 426, analyzes and displays the results of the simulation.

In one embodiment, the network load and average user throughput may be graphed to illustrate the relationship. The graph may confirm that a linear or nonlinear relationship may exist between the network load and the average user throughput. Network planners may use the relationship between average user throughput and network load to detect strain on carriers in the network.

Figure 5A:
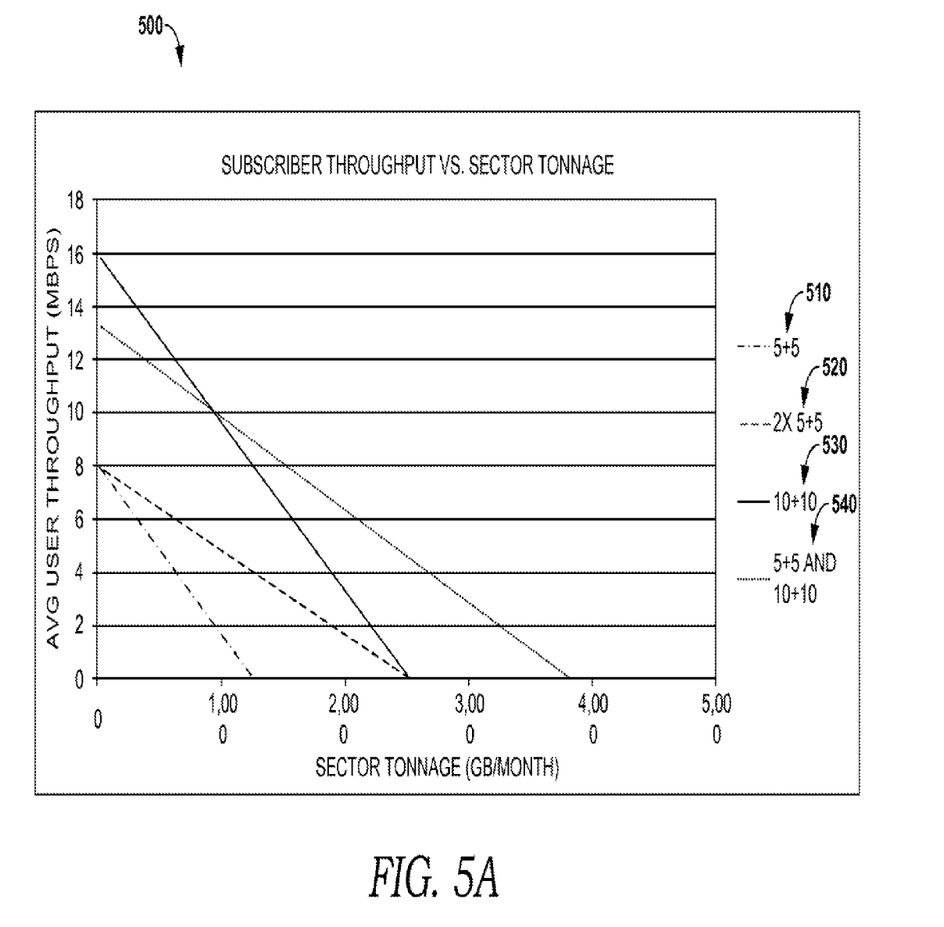
FIGS. 5A and 5B depicts an exemplary graph for mapping relationships between user throughput and sector load in accordance with embodiments of the invention.
Figure 5B:
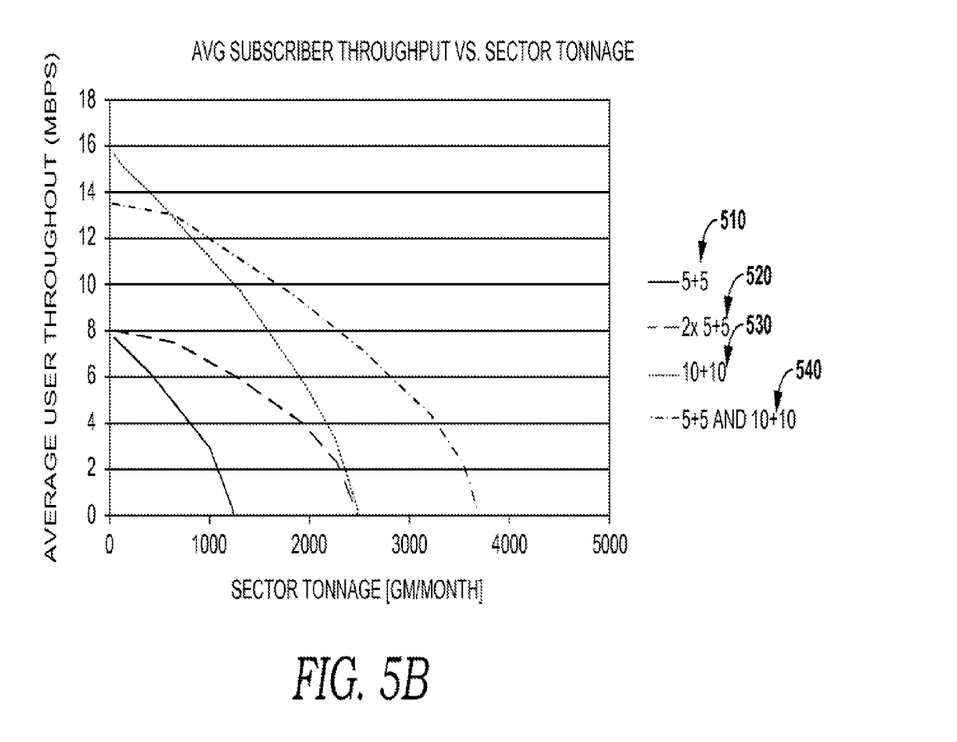

FIGS. 5A and 5B depicts an exemplary graph for mapping relationships between user throughput and sector load in accordance with embodiments of the invention. FIG. 5A illustrates a linear relationship gleaned from some simulated traffic. FIG. 5B illustrates a non-linear relationship gleaned from some simulated traffic. After several iterations, it may be evident that a linear or non-linear relationship exists. Carrier sizes vary from 1.4, 3, 5, 10, 15, to 20 MHz, with 5 MHz and 10 MHz being the most common sizes. The graph may include the carriers that are available. For instance, the carrier 510 may have two 5 MHz channels-one for upload one for download. Another carrier 520 may have four 5 MHz channels. Other carriers 530 may have two 10 MHz channels. Still some carriers 540 may have a combination of two 5 MHz channels and two 10 MHZ channels.

Spectral efficiency varies across the sector, with high spectral efficiency experienced when the wireless channel conditions are very good (like when the user is outdoors and close to the cell tower or radio), and low spectral efficiency when conditions are poor (like at the edge of the cell where signal strength is low and interference is high). An average downlink spectral efficiency of about 1.6 bps per Hertz has been observed in real network communications. A cell sector with a single downlink 5 MHz carrier may have an average unloaded throughput of approximately 8 Mbps. A single 10 MHz carrier would be have an average unloaded throughput of 16 Mbps.

In one embodiment, combinations of carrier sizes may vary the amount of traffic expected to be handled by each carrier. With a single 5 MHz carrier plus a single 10 MHz carrier, the traffic generator may estimate that ⅓ of the traffic is handled by the 5 MHz carrier, and ⅔ of the traffic would be handled by the 10 MHz carrier. In this case, the average unloaded throughput would be calculated as ⅓ of 8 Mbps plus ⅔ of 16 Mbps, or 13.33 Mbps.

The average user throughput can be graphed as a function of expected network load. When planning for growth in the network due to additional subscribers or through higher monthly usage per subscriber or any combination of the two, it is useful to express the effect of that growth as a change in the average user experience. For each of the carriers, the graph shows the relationship between average user throughput and network load. In one embodiment, this relationship is nonlinear. In other embodiments, this relationship is linear.

A straight-line (y=mx+b) formula may be used by the traffic generator in some embodiments to make appropriate predictions. The slope of the line may represent the change in average user throughput. The y-intercept may be the available effective bandwidth of channel, which incorporates spectral efficiencies. Accordingly, the slope of the line may be a function of the number and size of each carrier.

The traffic generator may employ a calculation that is based on the spectral efficiency applied to all carriers, a total sector monthly network load (GB/month), and the number of each kind of carrier size. The function may return the average user throughput in Kbps. In certain embodiments, the traffic generator establishes a percent for traffic handled by each carrier. The percent may be proportional to the carrier's bandwidth divided by total bandwidth of all the carriers. In pseudo code, the function may be:

```
Public Function UserThroughput (dSpectralEff As Double,
dTonnage As Double, iNum5s As Integer, iNum10s As Integer,
iNum20s As Integer, iNum20TDDs As Integer, iNum40TDDs As
Integer) As Double
    Dim dPctOn5, dPctOn10, dPctOn20, dPctOn20TDD, dPctOn40TDD
As Double
    Dim TddRatio, Intercept, dFactor As Double
    Dim d5, d10, d20, d20TDD, d40TDD As Double
    TddRatio = 2.4
    Intercept = 5000 * dSpectralEff       // Intercept is the y-
intercept for a 5 MHz carrier
    dFactor = −24 / 0.0667 * 3600 / 8192
    dPctOn5 = iNum5s / (iNum5s + 2 * iNum10s + 4 * iNum20s +
TddRatio * (iNum20TDDs + 2 * iNum40TDDs) )
    dPctOn10 = 2 * iNum10s / (iNum5s + 2 * iNum10s + 4 *
iNum20s + TddRatio * (iNum20TDDs + 2 * iNum40TDDs) )
    dPctOn20 = 4 * iNum20s / (iNum5s + 2 * iNum10s + 4 *
iNum20s + TddRatio * (iNum20TDDs + 2 * iNum40TDDs) )
    dPctOn20TDD = TddRatio * iNum20TDDs / (iNum5s + 2 * iNum10s
+ 4 * iNum20s + TddRatio * (iNum20TDDs + 2 * iNum40TDDs) )
    dPctOn40TDD = 2 * TddRatio * iNum40TDDs / (iNum5s +2 *
iNum10s + 4 * iNum20s + TddRatio * (iNum20TDDs + 2 *
iNum40TDDs) )
    If iNum5s = 0 Then d5 = 0 Else d5 = dPctOn5 ^ 2 / iNum5s
    If iNum10s = 0 Then d10 = 0 Else d10 = dPctOn10 ^ 2 /
iNum10s
    If iNum20s = 0 Then d20 = 0 Else d20 = dPctOn20 ^ 2 /
iNum20s
    If iNum20TDDs = 0 Then d20TDD = 0 Else d20TDD = dPctOn20TDD
^ 2 / iNum20TDDs
    If iNum40TDDs = 0 Then d40TDD = 0 Else d40TDD = dPctOn40TDD
^ 2 / iNum40TDDs
    UserThroughput = dTonnage * (d5 + d10 + d20 + d20TDD +
d4TDD) / dFactor + (Intercept * (dPctOn5 + 2 * dPctOn10 + 4 *
dPctOn20 + dPctOn20TDD * TddRatio + dPctOn40TDD * 2 * TddRatio) )
    End Function
```

The traffic generator may use this calculation to predict the user throughput for a given network load. Accordingly, a network planner may use the traffic generator to determine when and at what network load the average user throughput falls below an agreed upon quality of service.

In yet another embodiment, the traffic generator is configured to derive a function that establishes the relationship between the average user throughput and the network load. The network traffic may simulate the traffic on a sector in the network. The simulated traffic is processed by the carriers. In turn, the traffic generator estimates the user throughput, which may be used to derive a function that encapsulates the relationship between network load and user throughput.

Figure 6:
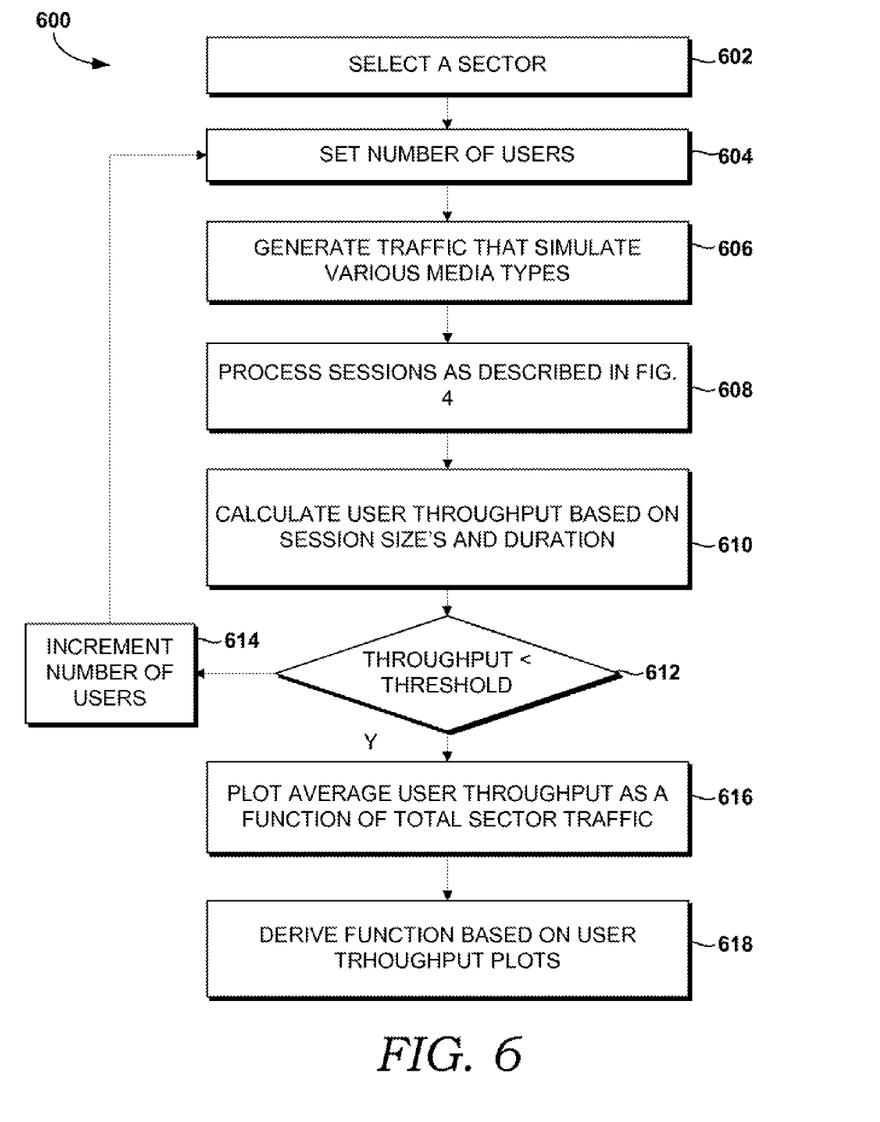
FIG. 6 depicts an exemplary logic diagram for estimating user throughput in accordance with embodiments of the invention.

FIG. 6 depicts an exemplary logic diagram for estimating user throughput in accordance with embodiments of the invention. In step 602, the traffic generator selects a sector. In some embodiments, the sector is a cell sector for a wireless network or a wired network. In step 604, a desired number for users of the network is set by the traffic generator. In step 606, the traffic generator generates traffic for all users. The traffic simulates various applications and media types that traverse the sector. The media types may be associated with applications executed by users of a wireless network. The applications include, among other applications, email applications, video applications, SMS applications, or web browsing applications. The generated traffic includes packets that vary in size based on the media types. The sizes may vary according to distribution models that correspond to the media types. In other embodiments, the traffic may be generated based on a number of users that connect to the network during a busy period. For instance, the busy period is approximately 10 hours per day.

The traffic generator, in step 608, executes the method of FIG. 4, to simulate carrier processing of the sessions. In one embodiment, the carriers include CDMA carriers, EVDO carriers, or LTE carriers. In step 610, the traffic generator estimates the user throughput based on the plurality carriers and total traffic processed in the sessions at each of the carriers. The session sizes and processing durations are used to arrive at the average user throughput. In step 612, the average user throughput is compared to a threshold. In one embodiment, the threshold may be set by a service level agreement. For instance, the threshold may identify the minimum throughput level acceptable for a group of users (e.g. 1 MB/s).

If the estimated average user throughput is above the threshold, the traffic generator may increment the number of users, in step 614. In one embodiment, the incremented number of users may be a multiple of two (e.g., 2, 4, 6, 8, 24, etc.). In turn, the traffic generator returns to processing step 604. Here, the traffic generator reestablishes a new set of users based on the incremented number of user. The simulation and method continues with the new set of users.

If the estimated average user throughput is below the threshold, the traffic generator, in step 616, plots the average user throughput as a function of total sector traffic. In step 618, a function is derived by the traffic generator based on the generated plots. The function may represent a relationship between the user throughput and network load on the sector. The function may be identified from relationships among estimated user throughput, the size of the generated traffic, and the carriers in the sector.

In summary, calculating average user throughput based on statistical models that simulate traffic in a wireless network allows a computer system to provide network planning functions for communication specialists. In one embodiment, a traffic generator simulates data sessions for groups of hypothetical users. The session start times are uniformly or randomly distributed in time, and the session or packet sizes are selected using Normal, LogNormal, Pareto, and Cauchy distributions where the average size was based upon the type of data service requested. As additional users are included in the simulation, more sessions overlap and the average bandwidth allocated to each session decreases, thereby increasing the time it takes to complete the sessions and affecting overall user throughput. By graphing the user throughput as a function of total traffic, a trend appears. This relationship may be used by the computing system to predict how additional traffic may affect the user throughput.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A Non-transitory computer-readable media having computer-executable instructions embodied thereon that, when executed, perform a method to estimate users throughputs, the method comprising: selecting a sector maintained by a network provider; generating traffic that simulates various media types that traverse the sector, wherein the generated traffic includes packets that vary in size based on the various media types; assigning the generated traffic to a plurality of carriers; establishing sessions with the plurality of carriers; wherein the following is performed for the established sessions: calculating a current load of the generated traffic for each session of the plurality of carriers calculating an effective data rate for the carriers based on spectral efficiencies for the carriers and the number of simultaneous sessions on each carrier, and reducing the current load by the effective data rate during each session until the current load reaches zero; and estimating the users throughputs based on the plurality carriers and total traffic processed in the sessions at each of the carriers.

2. The media of claim 1, wherein the sector is a cell sector for a wireless network.

3. The media of claim 2, wherein media types are associated with applications executed by users of a wireless network.

4. The media of claim 3, wherein the applications include email applications, video applications, SMS applications, or web browsing applications.

5. The media of claim 4, wherein the generated traffic includes packets that vary in size based on the media types.

6. The media of claim 5, wherein the sizes vary according to distribution models that correspond to the media types.

7. The media of claim 1, wherein the traffic is generated based on a number of users that connect to the network during a busy period.

8. The media of claim 7, wherein the busy period is any time period from one hour up to 10 hours per day.

9. The media of claim 1, wherein the carriers include CDMA carriers, EVDO carriers, or LTE carriers.

10. The media of claim 1, wherein establishing sessions with the plurality of carriers further comprises: generating a session identifier; storing a start time for each session; calculating a size of the generated traffic associated with each session; and storing the size of the generated traffic with a corresponding session identifier.

11. The media of claim 1, wherein assigning traffic further comprises: storing an end time for the session based on when the current load goes to zero.

12. The media of claim 1, further comprising: identifying a function from the estimated users throughputs, the size of the generated traffic, and the carriers in the sector.

13. A computer system for estimating users throughputs, the system comprising: memories to store computer-usable instruction that are executed by a processor that is configured to perform the following: (1) provide, by the computer processor, a graphical user interface that generates traffic for a cell sector, the graphical user interface having a media format field and carrier configuration field; (2) receive, by the computer processor, at the media format field, a size for packets generated by applications that produce packets corresponding to one or more media formats; and (a) receive, by the computer processor, at the carrier configuration field, a number of carriers in the network and a bandwidth of each carrier, wherein the processor is configured to execute a traffic generator, wherein the traffic generator performs the following: assigns the generated traffic to a plurality of carriers; establishes sessions with the plurality of carriers; wherein the following is performed for the established sessions: calculates a current load of the generated traffic for each session of the plurality of carriers, calculates an effective data rate for the carriers based on spectral efficiencies for the carriers, and reduces the current load by the effective data rate during each session until the current load reaches zero; and estimates the users throughputs at the sector.

14. The system of claim 13, wherein the media format field specifies a distribution model that corresponds to the packet size generated by the traffic generator.

15. The system of claim 13, wherein the traffic generator establishes sessions with the plurality of carriers as configured in the carrier configuration field, wherein the traffic generator creates a session identifier, stores a start time for each session, and stores a size of the generated traffic associated with each session with a corresponding session identifier.

16. The system of claim 15, wherein the traffic generator assigns calculates an effective data rate for the carriers based on spectral efficiencies for the carriers.

17. The system of claim 16, wherein the traffic generator stores an end time for the session based on when the current load goes to zero.

18. A Non-transitory computer-readable media having computer-executable instructions embodied thereon that, when executed, perform a method to estimate users throughputs, the method comprising: selecting a sector maintained by a network provider; generating traffic that simulates various media types that traverse the network; assigning the generated traffic to a plurality of carriers; establishing sessions with the plurality of carriers; calculating a current load of the generated traffic for each session of the plurality of carriers; calculating an effective data rate for the carriers based on spectral efficiencies for the carriers; reducing the current load by the effective data rate during each session until the current load reaches zero; storing an end time for the sessions based on when the current load goes to zero; and estimating users throughputs based on the plurality of carriers and total traffic processed by the sessions at each of the carriers in the sector.

19. The media of claim 18, wherein the sector is a cell sector of a wireless network.

20. The media of claim 19, wherein media types are associated with applications.

* * * * *